Figure 1:
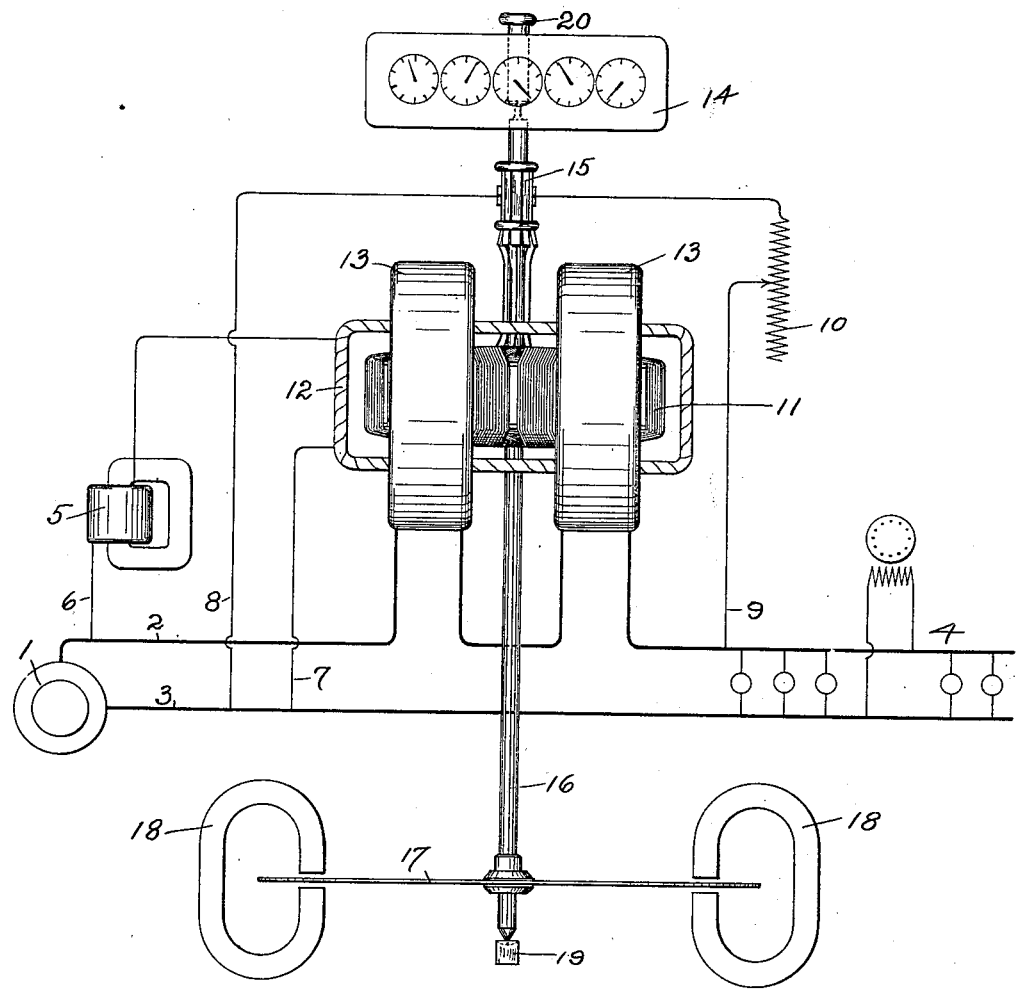

No. 698,673. Patented Apr. 29, 1902.
T. DUNCAN.
ELECTRIC METER.
(Application filed Nov. 27, 1899.)
(No Model.) 2 Sheets—Sheet 1.

WITNESSES: Samuel R. Bachtel William F. Meyer.

INVENTOR. Thomas Duncan

No. 698,673. Patented Apr. 29, 1902.
T. DUNCAN.
ELECTRIC METER.
(Application filed Nov. 27, 1899.)

(No Model.) 2 Sheets—Sheet 2.

WITNESSES: INVENTOR.
Samuel R. Bachtel Thomas Duncan
William F. Meyer.

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRIC METER.

SPECIFICATION forming part of Letters Patent No. 698,673, dated April 29, 1902.

Application filed November 27, 1899. Serial No. 738,286. (No model.)

*To all whom it may concern:*

Be it known that I, THOMAS DUNCAN, a citizen of the United States, and a resident of Chicago, in the county of Cook and State of Illinois, have invented certain new and useful Improvements in Electric Meters, of which the following is a specification.

The invention relates to improvements in motor-meters for alternating currents, and particularly to the type known in the art as "commutated" and "contact" meters.

The object of the invention is to provide a meter of the commutated type whose magnetic field that is produced by the armature-windings will be exactly in phase with the impressed electromotive force. In meters of this class or those in which the electromotive force is represented by the shunt-windings of the armature it is necessary that the magnetism produced by the armature should be exactly in phase with the electromotive force in order to make the readings of the meter correct on inductive loads. Meters with shunt-wound armatures must necessarily be wound with a great number of turns, so as to keep the energy consumed as low as possible when competing with the induction type of motor-meters, which are much more efficient for alternating-current service than the commutated type. The many turns of wire wound upon the armature cause the shunt-current which traverses it to lag behind the impressed electromotive force by an amount depending upon the self-inductive effect of these turns, and by increasing their number to lessen the energy consumed this self-inductive or lagging effect becomes very manifest, since it increases at a rate proportional to the square of the turns. For this reason it is obvious that some means must be employed to neutralize or compensate for the inductance of the armature-circuit in order that the turns may be increased by any practical amount to reduce the energy as much as possible or to the same amount as is consumed in the most modern types of induction motor-meters.

In measuring the true watts on inductive loads the meter must have a magnetic field that is coincident in phase with the pressure; otherwise the indication will only be approximate. If it be assumed, for example, that the inductance of the armature causes the current through it to lag ten degrees, then the meter will register only about ninety-eight per cent. of the actual power instead of one hundred per cent., and if the current be caused to lag ninety degrees behind the pressure the meter will continue to rotate, since the phase difference between the magnetism of the armature and the magnetism of the series coils will only be eighty degrees and would require a lag of one hundred degrees between the impressed electromotive force and the current before the meter would cease to rotate, whereas it ought to stop when the angle of lag is ninety degrees.

Figure 2:
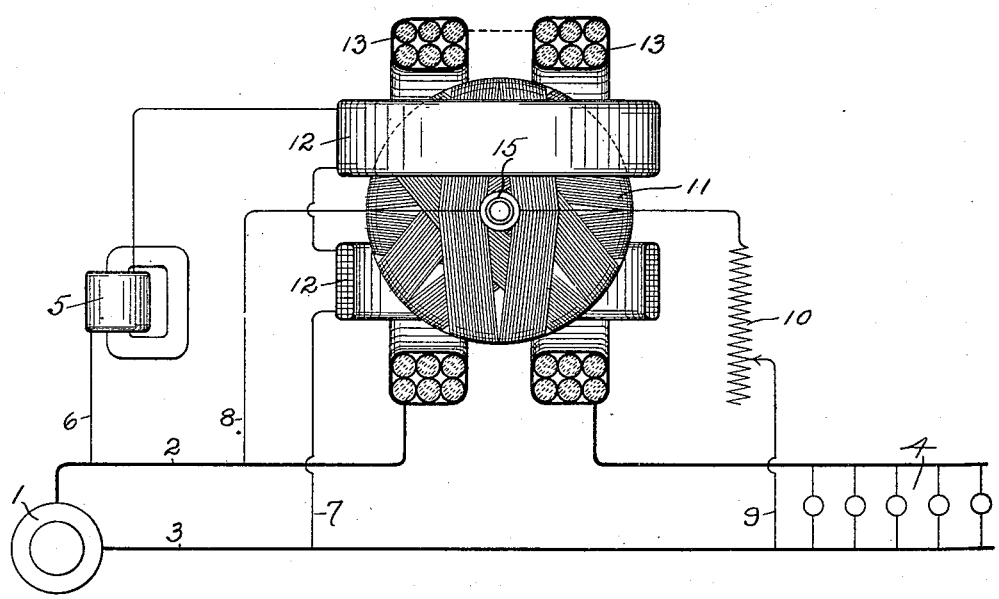
Figure 3:
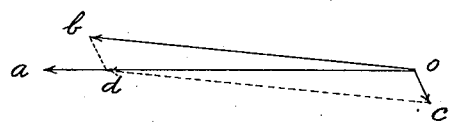

In the accompanying drawings, which form part of this specification, Figure 1 is a front elevation showing the arrangement of its operative parts. Fig. 2 is a plan view showing some of the magnetizing or field coils in section. Fig. 3 is a vector diagram showing the phase relations of the electromotive force, shunt-currents, and the effective magnetism of the armature.

In describing the improvements there is employed a generator of alternating currents 1, which supplies the translating devices 4 by means of leads or wires 2 and 3. Included in circuit with one of the said leads are the two series field-coils 13 and 13 and through which the current passes that is supplied to the translating devices. These coils set up a magnetic field that is proportional to the current in amperes. A revoluble shunt-wound armature 11 is mounted upon a spinple 16, which rests upon a step 19 and is held in a vertical position by the upper bearing 20. This armature 11 is wound with many turns of fine wire and having the terminals of its coils connected in any suitable manner to the commutator 15. The shunt-current supplied to the armature-coils is taken from the leads 2 and 3 with the wires 8 and 9. To assist in keeping down the inductance and energy, a non-inductive resistance 10 is used in series with the armature in the ordinary manner. To supply a magnetic field in phase with the pressure, I employ the magnetizing-coils 12 and 12, whose magnetic axis is coaxial with the magnetic axis of the armature 11 and at right angles to the magnetic axis of the series field-coils 13 and 13. The current through the coils 12 and 12 is in an opposite direction to that through the armature 11, setting up thereby a phase difference of one hundred and eighty degrees. This displacement of phase is further augmented by the insertion of an impedance-coil 5 in circuit with the coils 12 and 12. The coils 12 and 12 are supplied with current from the same source as the armature by the wires 6 and 7. In Fig. 3 the line $o\ a$ represent the impressed electromotive force; the line $o\ b$, the current and magnetism of the armature 11; the line $o\ c$, the current and magnetism of the magnetizing-coils 12 and 12, and the line $o\ d$ the resultant magnetism of the two lines $o\ b$ and $o\ c$, or the effective magnetism that represents the volts and which coöperates with the magnetism of the coils 13 and 13 in developing the torque which sets the armature in motion. The revolutions of the armature are integrated by the train 14, which may be of any well-known type. To make the speed of the armature proportional to the torque and to the watts, any ordinary magneto-electric damping device may be employed, and here comprises an aluminium disk 17, embraced in its revolutions between the poles of the permanent magnets 18 and 18.

The improvement may be applied to other forms of meters which employ a shunt-coil to represent the pressure in volts, such as the well-known forms of oscillating and clock meters or those in which contacts in lieu of a commutator are operated either periodically or by the movements of the meter itself, without departing from the scope or spirit of the nvention.

Since the coils 12 and 12 are in effect the same as one coil which is divided into two, so as to permit of the spindle being operated in the center, I have referred to these coils in the claims as the "magnetizing-coil."

I claim—

1. In a commutated motor-meter, a series field-coil, a shunt-wound armature, a magnetizing-coil that is magnetically coaxial with said armature, and means for integrating the revolutions of said armature.

2. In a motor-meter of the class described, a series field coil or coils, a movable armature, a magnetizing-coil that is magnetically coaxial with said armature and at right angles to the magnetic axis of said series field coil or coils, and means for integrating the revolutions of said armature.

3. In a motor-meter of the class described, a series field-coil, a shunt-wound revoluble armature, a commutator for said armature, a magnetizing coil or coils having the same magnetic axis as said armature, the magnetic axes of both the armature and magnetizing coil or coils at an angle to the magnetic axis of said series field-coil, a magneto-electric damping device, and means for integrating the revolutions of said armature.

4. In an energy meter of the class described, a series field-coil, a revoluble armature, means for conducting current into said armature from the source of pressure, a non-inductive resistance in series with the armature, a magnetizing-coil receiving current from the same source of pressure as said armature, the current of the magnetizing-coil having a different time period from the current traversing said armature, and means for lagging the current traversing the magnetizing-coil.

5. In a meter for measuring alternating currents, a series field-coil, a shunt-wound armature, a non-inductive resistance in series with said armature, a magnetizing-coil in coöperative relation with said armature, an impedance-coil in series with said magnetizing-coil, the magnetic axes of the series field and magnetizing coils being at right angles, a contact device for conducting current to the armature, a magneto-electric damping device, and an integrating mechanism responding to the revolutions of the armature.

6. The combination with a meter for alternating currents of a series field-coil, a shunt-wound armature having its magnetic or polar axis at an angle to the polar axis of said series field-coil, a magnetizing-coil that is magnetically coaxial with said armature, and means for lagging the current traversing said magnetizing-coil.

7. In a commutated motor-meter, the combination with a commutated shunt-wound armature, of a field-winding, and a phase-modifying winding in inductive relation with said armature, substantially as described.

8. In a commutated motor-meter, the combination with a commutated shunt-wound armature, of a field-winding, and a phase-modifying winding in inductive relation with said armature, and connected in parallel therewith in the work-circuit, substantially as described.

In testimony that I claim the foregoing as my invention I affix my signature, in the presence of two subscribing witnesses, this 11th day of November, A. D. 1899.

THOMAS DUNCAN.

Witnesses:
J. W. DALTON,
WM. F. MEYER.